(12) United States Patent
Nakanishi (10) Patent No.: US 11,294,366 B2
(45) Date of Patent: Apr. 5, 2022

(54) MONITORING SYSTEM, MONITORING METHOD AND MONITORING PROGRAM FOR STEAM-USING FACILITY

(71) Applicant: TLV Co., Ltd., Kakogawa (JP)

(72) Inventor: Kazuki Nakanishi, Kakogawa (JP)

(73) Assignee: TLV Co., Ltd., Kakogawa (JP)

( * ) Notice: Subject to any disclaimer, the term of this patent is extended or adjusted under 35 U.S.C. 154(b) by 0 days.

(21) Appl. No.: 17/427,310

(22) PCT Filed: Oct. 24, 2019

(86) PCT No.: PCT/JP2019/041669
§ 371 (c)(1),
(2) Date: Jul. 30, 2021

(87) PCT Pub. No.: WO2020/158072
PCT Pub. Date: Aug. 6, 2020

(65) Prior Publication Data
US 2022/0043438 A1 Feb. 10, 2022

(30) Foreign Application Priority Data

Jan. 13, 2019 (JP) .............................. JP2019-016298

(51) Int. Cl.
*G05B 23/02* (2006.01)
*F16T 1/48* (2006.01)
(Continued)

(52) U.S. Cl.
CPC ......... *G05B 23/0259* (2013.01); *F01D 25/00* (2013.01); *F01D 25/32* (2013.01); *F16T 1/48* (2013.01); *G05B 15/02* (2013.01)

(58) Field of Classification Search
CPC .... G05B 23/0259; G05B 23/02; G05B 15/02; F01D 25/00; F01D 25/32; F16T 1/48
See application file for complete search history.

(56) References Cited

U.S. PATENT DOCUMENTS 5,992,436 A * 11/1999 Hellman .................. F16T 1/48
137/1
8,172,153 B1 * 5/2012 Kennedy ............ G05D 23/1934
236/1 B
(Continued)

FOREIGN PATENT DOCUMENTS

JP 2003130289 A 5/2003
JP 2005299867 A 10/2005
(Continued)

*Primary Examiner* — Ronald D Hartman, Jr.
(74) *Attorney, Agent, or Firm* — The Webb Law Firm (57) ABSTRACT

A monitoring system that monitors a steam-using facility includes a temperature sensor that is a trap temperature sensor configured to detect a temperature of a steam trap provided in a steam discharge unit and/or a steam temperature sensor configured to detect a temperature of steam flowing into the steam trap and a pressure sensor configured to detect a pressure of steam flowing into the steam trap. The monitoring system determines that there is an occurrence of an abnormality or a sign of the abnormality in the steam trap when (i) a temperature detection value obtained by the temperature sensor and/or statistical temperature data obtained by performing statistical processing on the temperature detection value deviates from a predetermined criterion thereof and (ii) a pressure detection value obtained by the pressure sensor and/or statistical pressure data obtained by performing statistical processing on the pressure detection value deviates from a predetermined criterion thereof.

5 Claims, 4 Drawing Sheets

(51) Int. Cl.
  *G05B 15/02*   (2006.01)
  *F01D 25/32*   (2006.01)
  *F01D 25/00*   (2006.01)

(56) References Cited

U.S. PATENT DOCUMENTS

| | | | |
|---|---|---|---|
| 2006/0118647 A1* | 6/2006 | Cheskaty | F16T 1/48 236/93 R |
| 2007/0057802 A1* | 3/2007 | Fujiwara | F16T 1/48 340/605 |
| 2008/0249744 A1* | 10/2008 | Fujiwara | G05B 23/0254 702/183 |
| 2012/0204650 A1* | 8/2012 | Kleven | F16T 1/48 73/644 |
| 2016/0161928 A1* | 6/2016 | Bobker | G05B 15/02 700/275 |
| 2017/0081976 A1 | 3/2017 | Tsuchiiwa et al. | |
| 2017/0227213 A1 | 8/2017 | Fujiwara | |
| 2017/0227953 A1 | 8/2017 | Nagase | |
| 2017/0323238 A1* | 11/2017 | Tanaka | F01K 13/003 |
| 2020/0019139 A1* | 1/2020 | Mita | G05B 23/0278 |
| 2020/0056964 A1* | 2/2020 | Mita | G05B 23/0283 |

FOREIGN PATENT DOCUMENTS

| | | | | |
|---|---|---|---|---|
| JP | 2010204801 A | | 9/2010 | |
| JP | 2015222054 A | | 12/2015 | |
| JP | 201790020 A | | 5/2017 | |
| WO | WO-2020158072 A1 * | | 8/2020 | F16T 1/48 |

* cited by examiner

MONITORING SYSTEM, MONITORING METHOD AND MONITORING PROGRAM FOR STEAM-USING FACILITY

CROSS-REFERENCE TO RELATED APPLICATIONS

This application is the United States national phase of International Application No. PCT/JP2019/041669 filed Oct. 24, 2019, and claims priority to Japanese Patent Application No. 2019-016298 filed Jan. 31, 2019, the disclosures of which are hereby incorporated by reference in their entirety.

BACKGROUND OF THE INVENTION

Field of the Invention

The present invention relates to a monitoring system, a monitoring method, and a monitoring program for monitoring a steam-using facility.

Description of Related Art

If a steam-using device breaks down in a steam-using facility that is constituted by the steam-using device, the steam-using device needs to be repaired or replaced, and operation of the steam-using facility needs to be stopped for the repair or replacement, and accordingly, a repair cost or a replacement cost is incurred, and a profit that would otherwise be made by operating the steam-using facility will be lost, which may result in a huge loss. This is because a steam-using facility is commonly designed so as to operate stably as a result of the temperature and the pressure of steam being maintained within predetermined control ranges during the operation, and if the operation of the facility is stopped by stopping steam supply, a long time and a large amount of labor may be required until the temperature and the pressure reach the predetermined control ranges when the operation of the facility is resumed.

In view of the above nature, steam-using devices are continuously operated as far as possible. In terms of maximizing production opportunities, ideally, it is preferable that the facility is stopped only when the facility has to be stopped due to external factors such as periodic maintenance and a long vacation, and the facility is continuously operated during other periods. Accordingly, maintenance such as repair and replacement of devices, for which the facility needs to be stopped, is preferably performed only during a scheduled stop period for periodic maintenance or the like. In order to operate the facility as described above, it is necessary to find a sign of an abnormality in a device before the abnormality becomes serious.

For example, JP 2015-222054A (Patent Document 1) discloses a technology for detecting the state of a steam control device that is provided in a steam pipe attached to a steam-using device, and estimating operation conditions of the steam-using device based on the state. With this technology, it is possible to detect an abnormality in the operation conditions of the steam-using device beforehand in a stage in which an abnormality occurs in the steam control device, before a stage in which a problem occurs in the steam-using device.

Patent Document 1: JP 2015-222054A

SUMMARY OF THE INVENTION

However, in the technology disclosed in Patent Document 1, the state of the steam control device needs to be detected, and the speed of response to a sign of an abnormality may not be sufficiently high.

Therefore, there is a demand for realizing a monitoring system that can find a sign of an abnormality earlier.

A monitoring system according to the present invention is a monitoring system configured to monitor a steam-using facility that includes a steam supply unit that is supplied with steam, a steam-using unit that uses supplied steam, and a steam discharge unit that discharges steam after use, the monitoring system including: a temperature sensor that is a trap temperature sensor configured to detect a temperature of a steam trap provided in the steam discharge unit and/or a steam temperature sensor configured to detect a temperature of steam flowing into the steam trap; and a pressure sensor configured to detect a pressure of steam flowing into the steam trap, wherein the monitoring system determines that there is an occurrence of an abnormality or a sign of the abnormality in the steam trap when (i) a temperature detection value obtained by the temperature sensor and/or statistical temperature data obtained by performing statistical processing on the temperature detection value deviates from a predetermined criterion thereof and (ii) a pressure detection value obtained by the pressure sensor and/or statistical pressure data obtained by performing statistical processing on the pressure detection value deviate from a predetermined criterion thereof.

A monitoring method according to the present invention is a monitoring method for monitoring a steam-using facility that includes a steam supply unit that is supplied with steam, a steam-using unit that uses supplied steam, and a steam discharge unit that discharges steam after use, the monitoring method including: a temperature detection step of detecting a temperature of a steam trap provided in the steam discharge unit and/or a temperature of steam flowing into the steam trap; a pressure detection step of detecting a pressure of steam flowing into the steam trap; and a determination step of determining that there is an occurrence of an abnormality or a sign of the abnormality in the steam trap when (i) a temperature detection value obtained in the temperature detection step and/or statistical temperature data obtained by performing statistical processing on the temperature detection value deviates from a predetermined criterion thereof and (ii) a pressure detection value obtained in the pressure detection step and/or statistical pressure data obtained by performing statistical processing on the pressure detection value deviates from a predetermined criterion thereof.

A monitoring program according to the present invention is a monitoring program for monitoring a steam-using facility that includes a steam supply unit that is supplied with steam, a steam-using unit that uses supplied steam, and a steam discharge unit that discharges steam after use, the monitoring program causing a computer to execute: a temperature detection function for detecting a signal from a trap temperature sensor configured to detect a temperature of a steam trap provided in the steam discharge unit and/or a steam temperature sensor configured to detect a temperature of steam flowing into the steam trap; a pressure detection function for detecting a signal from a pressure sensor configured to detect a pressure of steam flowing into the steam trap; and a determination function for determining that there is an occurrence of an abnormality or a sign of the abnormality in the steam trap when (i) a temperature detection value obtained by executing the temperature detection function and/or statistical temperature data obtained by performing statistical processing on the temperature detection value deviates from a predetermined criterion thereof and (ii) a pressure detection value obtained by executing the pressure detection function and/or statistical pressure data obtained by performing statistical processing on the pressure detection value deviates from a predetermined criterion thereof.

With these configurations, it is possible to perform repair, inspection, or the like on a device as a preventive measure before an abnormality in the device becomes serious and the steam-using facility has to be stopped. In particular, the temperature and the pressure of steam respond to an abnormality in the device more quickly than physical quantities (temperature, vibration, etc.) relating to the steam trap itself, and therefore, a sign of the abnormality can be found earlier than when a conventional monitoring system is used.

The following describes preferable aspects of the present invention. However, the scope of the present invention is not limited by the following examples of preferable aspects.

It is preferable that in one aspect, the monitoring system according to the present invention determines that there is an occurrence of an abnormality or there is a sign of the abnormality in a steam supply valve that is provided in the steam supply unit when (i) the pressure detection value and/or the statistical pressure data deviates from a predetermined criterion thereof and (ii) the temperature detection value and the statistical temperature data satisfy predetermined criteria thereof.

With this configuration, it is possible to find a sign of an abnormality relating to the steam supply valve, in addition to the steam trap. Accordingly, it is possible to infer what kind of abnormality is occurring in which part of the steam-using facility, with high accuracy, and therefore, appropriate maintenance can be performed with ease and production opportunities are unlikely to be lost.

It is preferable that in one aspect, the monitoring system according to the present invention further includes an abnormality notification unit that can notify a manager of the steam-using facility of occurrence of an abnormality when it is determined that there is an occurrence of the abnormality or there is a sign of the abnormality.

With this configuration, the manager can immediately recognize the occurrence or the sign of the abnormality, and therefore, production opportunities are further unlikely to be lost.

It is preferable that in one aspect, in the monitoring system according to the present invention, the steam trap includes an automatic cleaning mechanism that can automatically remove a clogging material generated in the steam trap, and the monitoring system operates the automatic cleaning mechanism upon determining that there is an occurrence of an abnormality or a sign of the abnormality in the steam trap.

With this configuration, the abnormality or the sign of the abnormality can be solved without manual maintenance being performed, and therefore, production opportunities are further unlikely to be lost.

Further features and advantages of the present invention will be clarified by the description of exemplary and non-limiting embodiments given below with reference to the drawings.

DETAILED DESCRIPTION OF PREFERRED EMBODIMENTS

An embodiment of a monitoring system, a monitoring method, and a monitoring program according to the present invention will be described with reference to the drawings. The following describes, as an example, a method for monitoring a steam-using facility 2 by using a monitoring system 1 to which the monitoring system according to the present invention is applied. Note that the monitoring program according to the present invention is installed in the monitoring system 1.

In the claims, specification, drawings, and abstract of the present application, a "steam-using facility" means a facility that operates by consuming energy of steam, such as a device that is driven by kinetic energy taken out from steam or a device that heats a target object by consuming thermal energy of steam. Examples of steam-using facilities include a steam turbine, a hot-water generation unit, a press machine, an autoclave, a reactor, and a heater, but there is no limitation to these facilities.

Basic Configuration of Steam-Using Facility

Figure 1:
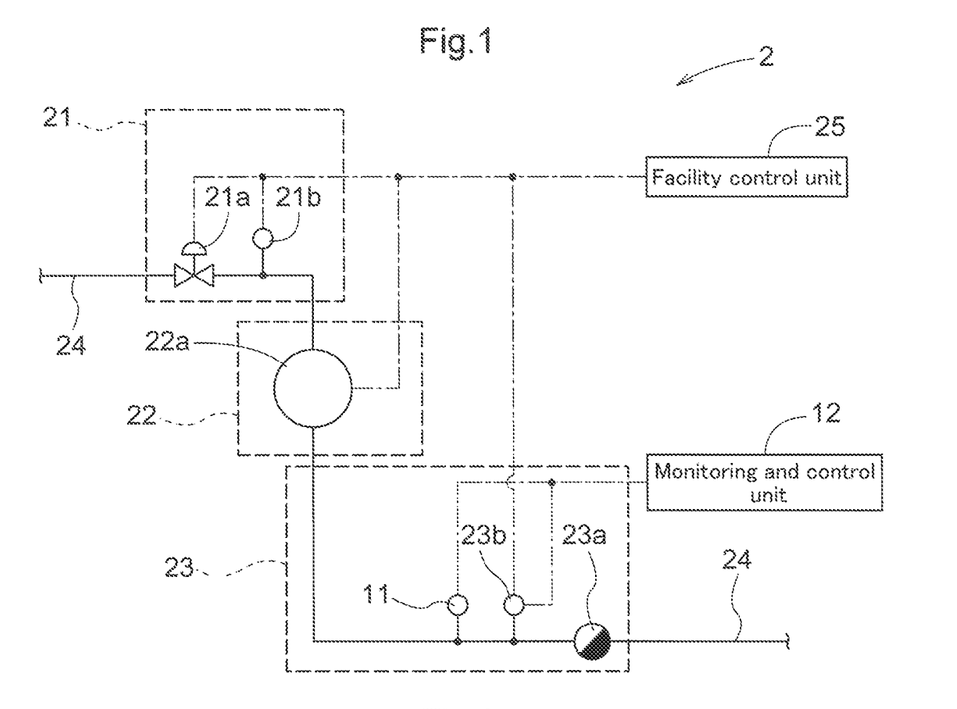
FIG. 1 is a configuration diagram of a monitoring system according to an embodiment of the present invention and a steam-using facility.

First, a configuration of the steam-using facility 2 that is monitored by the monitoring system 1 according to the present embodiment will be described. The steam-using facility 2 includes a steam supply unit 21 that is supplied with steam, a steam-using unit 22 that operates by consuming energy of steam, and a steam discharge unit 23 that discharges steam after use (FIG. 1). Devices that are provided in the steam supply unit 21, the steam-using unit 22, and the steam discharge unit 23 are connected by a steam pipe 24 such that steam can flow therethrough. Also, the steam-using facility 2 includes a facility control unit 25 that controls operations of the entire steam-using facility 2. In principle, the steam-using facility 2 is continuously operated except for a scheduled stop period for periodic maintenance or the like and unexpected stop periods for performing maintenance such as repair and replacement of devices.

The steam supply unit 21 is supplied with steam from a steam supply system (not shown) of a plant in which the steam-using facility 2 is installed, and controls the amount of steam taken in from the steam supply system by using a control valve 21a (an example of a steam supply valve). An opened degree of the control valve 21a is controlled by the facility control unit 25. More specifically, the facility control unit 25 performs feedback control on the opened degree of the control valve 21a such that control parameters such as the temperature and the pressure of steam in the steam-using unit 22 are within desired ranges.

Also, a supply side steam temperature sensor 21b for detecting the temperature of steam taken in from the steam supply system is provided in the steam supply unit 21. A detection signal of the supply side steam temperature sensor 21b is input to the facility control unit 25, and the facility control unit 25 controls the steam-using facility 2 considering the temperature of steam taken into the steam supply unit 21.

In the steam-using unit 22, energy of steam flowing from the steam supply unit 21 is consumed as heat or motive power for driving a steam-using device 22a. Accordingly, the temperature and the pressure of steam discharged from the steam-using unit 22 to the steam discharge unit 23 are lower than the temperature and the pressure of steam taken into the steam supply unit 21.

Note that a drive unit (not shown) and various sensors (not shown) that are provided in the steam-using unit 22 are communicably connected to the facility control unit 25, and operations of the steam-using unit 22 are controlled by the facility control unit 25.

The steam discharge unit 23 discharges steam used by the steam-using unit 22 to the outside of the system, and controls discharge of the steam using a steam trap 23a. The steam trap 23a has a mechanism for automatically opening and discharging drain accumulated in the steam trap when the amount of accumulated drain exceeds a predetermined amount, and thereafter automatically closing again. The steam trap 23a includes an automatic cleaning mechanism (not shown) for automatically removing a clogging material generated in an orifice portion that constitutes a steam discharge passage in the steam trap 23a. Operations of the automatic cleaning mechanism are controlled by the monitoring system 1 as described later.

Also, a discharge side steam temperature sensor 23b for detecting the temperature of steam flowing into the steam trap 23a is provided in the steam discharge unit 23. A detection signal of the discharge side steam temperature sensor 23b is input to the facility control unit 25, and the facility control unit 25 controls the steam-using facility 2 considering the temperature of discharged steam. The detection signal of the discharge side steam temperature sensor 23b is also input to a monitoring and control unit 12 of the monitoring system 1 and is also used when the monitoring system 1 determines the state of the steam-using facility 2 as described later.

Furthermore, a pressure sensor 11 for detecting the pressure of steam flowing into the steam trap 23a is provided in the steam discharge unit 23. A detection signal of the pressure sensor 11 is input to the monitoring and control unit 12 of the monitoring system 1 and is used when the monitoring system 1 determines the state of the steam-using facility 2 as described later.

Basic Configuration of Monitoring System

Figure 2:
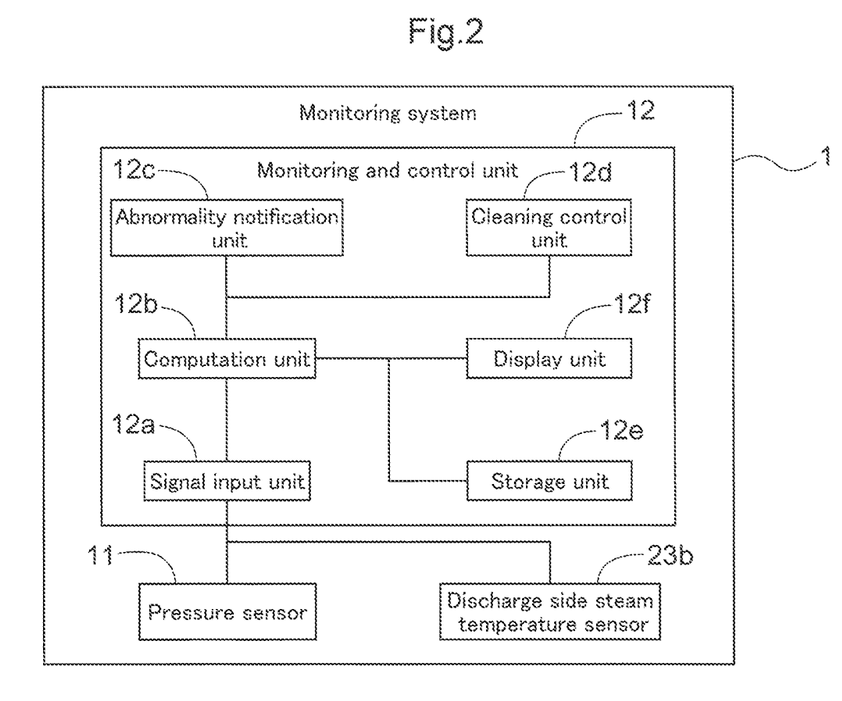
FIG. 2 is a configuration diagram of the monitoring system according to an embodiment of the present invention.

Next, a configuration of the monitoring system 1 according to the present embodiment will be described. The monitoring system 1 includes the pressure sensor 11, the discharge side steam temperature sensor 23b (an example of a steam temperature sensor), and the monitoring and control unit 12 (FIGS. 1 and 2). As described above, the pressure sensor 11 and the discharge side steam temperature sensor 23b are both provided in the steam discharge unit 23 and can detect the temperature and the pressure of steam flowing into the steam trap 23a.

Since a detection value of the discharge side steam temperature sensor 23b is used for both control of the steam-using facility 2 performed by the facility control unit 25 and monitoring of the steam-using facility 2 performed by the monitoring system 1, the discharge side steam temperature sensor 23b is a constitutional element of the monitoring system 1, as well as being a constitutional element of the steam-using facility 2. In this configuration, a sensor for production management can also be used for monitoring, and therefore, the number of sensors installed can be reduced.

The monitoring and control unit 12 includes a signal input unit 12a, a computation unit 12b, an abnormality notification unit 12c, a cleaning control unit 12d, a storage unit 12e, and a display unit 12f. Detection signals of the discharge side steam temperature sensor 23b and the pressure sensor 11 are input to the signal input unit 12a and given to the computation unit 12b.

The computation unit 12b determines the state of the steam-using facility 2 based on the detection signals of the discharge side steam temperature sensor 23b and the pressure sensor 11. More specifically, the computation unit 12b determines whether or not there is an abnormality in the steam trap 23a and the control valve 21a.

When it is determined by the computation unit 12b that there is an abnormality in the steam trap 23a and/or the control valve 21a, the abnormality notification unit 12c issues a signal for notifying a manager of the steam-using facility 2 of the occurrence of the abnormality. The signal may be a signal that can be directly recognized by the manager, such as light or sound, or a signal that controls a communication device so that the manager can receive the notification using means such as a phone or an e-mail.

Also, when it is determined by the computation unit 12b that there is an abnormality in the steam trap 23a, the cleaning control unit 12d issues a signal for operating the automatic cleaning mechanism provided in the steam trap 23a. The signal is input to the steam trap 23a and the automatic cleaning mechanism operates.

Information that is handled by the monitoring system 1, such as detection signals of the discharge side steam temperature sensor 23b and the pressure sensor 11, which are input to the signal input unit 12a, and information generated by the computation unit 12b through computation, is accumulated in the storage unit 12e.

Also, in the present embodiment, current values and history values of detected temperature and detected pressure, various types of statistical data, and various other types of information are displayed in the display unit 12f, and the manager of the steam-using facility 2 can check these types of information as appropriate.

Typical Abnormality in Steam-Using Facility

Here, as a premise for describing a method for determining the occurrence of an abnormality in the steam-using facility 2, two typical abnormalities that may occur in the steam-using facility 2 will be described.

First, a clogging abnormality in the steam trap 23a will be described. Steam that circulates through a steam plant may contain impurities, foreign matters, and substances that fall off or are eluted from constitutional elements thereof such as pipes or the like. Such substances are likely to be deposited and accumulate in the steam trap 23a that is disposed at a terminal end portion of a piping system, and are particularly likely to be deposited and accumulate in the orifice portion constituting the steam discharge passage. The orifice portion is formed to be narrow in order to precisely control opening and closing of the steam trap 23a, and therefore, foreign matters generated in the orifice portion may hinder smooth discharge of drain. More specifically, when foreign matters are slightly generated, discharge of drain becomes unstable, and when foreign matters are significantly generated, the orifice portion is completely clogged and the drain is not discharged. Here, in the state where discharge of drain is unstable, typically, the followings are repeated: the drain is accumulated more than a predetermined amount designed for the steam trap 23a, and when the clogging is temporarily solved for some reason, the drain is discharged and then again accumulated more than the predetermined amount.

When the clogging abnormality occurs in the steam trap 23a, the temperature of the steam trap 23a becomes lower than that during normal operation as a result of the drain being accumulated more than the predetermined amount in the steam trap 23a. Under the influence of this, the temperature of steam flowing into the drain also decreases. Furthermore, the pressure of steam inside the steam pipe 24 increases because the drain is not discharged within the assumption.

Next, an abnormality in the control valve 21a will be described. As described above, feedback control is performed by the facility control unit 25 on the opened degree of the control valve 21a such that control parameters such as the temperature and the pressure of steam in the steam-using unit 22 are within desired ranges. Here, the control valve 21a is constituted by a mechanical valve such as a glove valve or a gate valve. Accordingly, if a mechanical component constituting the control valve 21a deteriorates due to corrosion, wear, or the like, the control valve 21a may not be controlled as calculated. For example, if a movable portion of the control valve 21a has corroded and opening and closing operations of the control valve 21a are not smoothly performed, when a signal indicating an instruction for opening or closing the valve is received from the facility control unit 25, response of an actual valve opening operation or an actual valve closing operation is delayed. As a result, a fluctuation range of the pressure of steam inside the steam pipe 24 increases. On the other hand, instantaneous values and a fluctuation range of the temperature of the steam do not change much from those during normal operation.

Monitoring Method According to the Present Embodiment

In view of the typical abnormalities described above, the presence or absence of abnormalities presently occurring in the steam trap 23a and the control valve 21a and signs of such abnormalities can be detected based on the temperature and the pressure of steam flowing into the steam trap 23a. For this purpose, the monitoring system 1 continuously monitors the steam-using facility 2 irrespective of whether the steam-using facility 2 is operating or stopped. In particular, the monitoring system always continues detecting the temperature and the pressure of steam flowing into the steam trap 23a.

Figure 3:
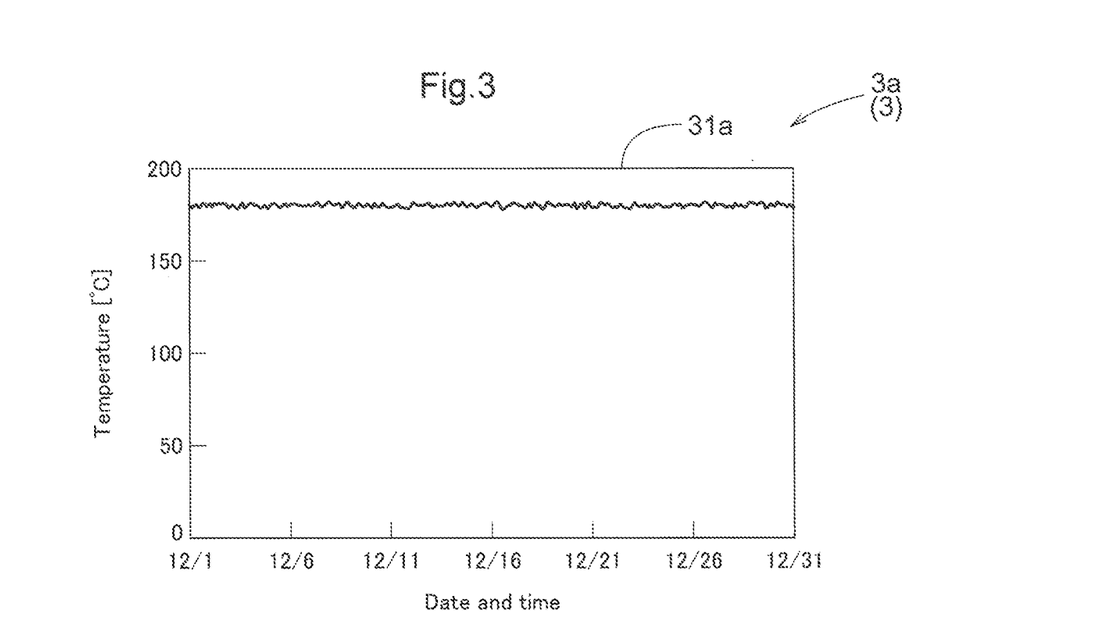
FIG. 3 is an example of a temperature trend graph when the steam-using facility is operating normally.
Figure 4:
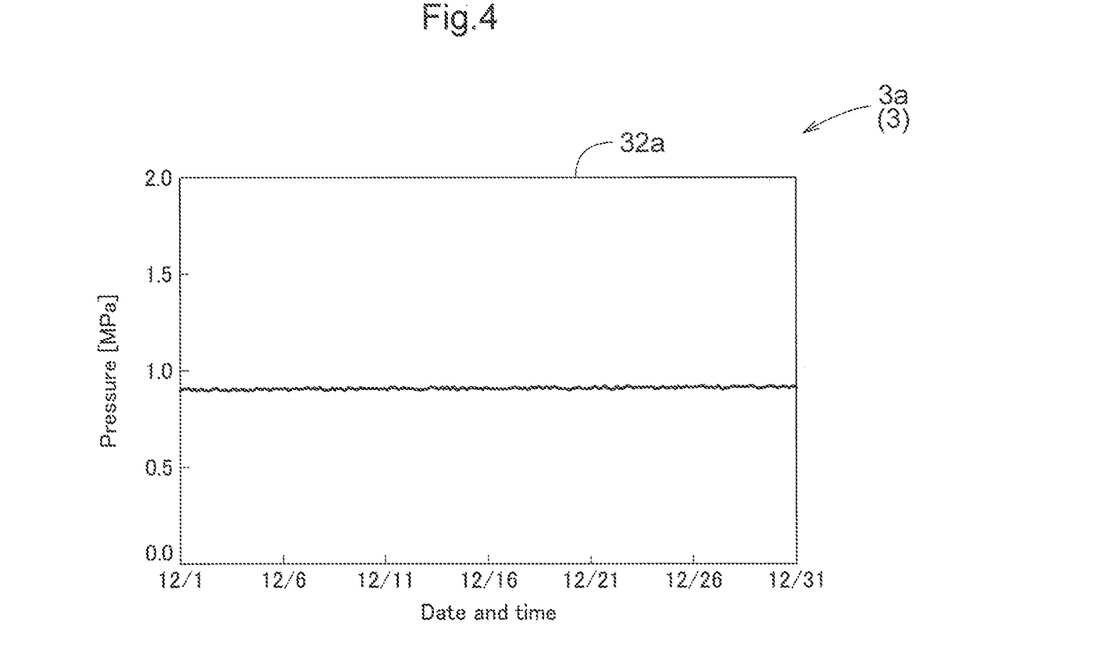
FIG. 4 is an example of a pressure trend graph when the steam-using facility is operating normally.

The computation unit 12b generates trend graphs 3 (FIGS. 3 to 8) of the temperature and the pressure based on current values and history values of detection signals of the discharge side steam temperature sensor 23b and the pressure sensor 11, which are input to the signal input unit 12a. Here, when the steam-using facility 2 is operating normally, values of the temperature and the pressure are kept at values that satisfy predetermined reference value ranges (examples of a predetermined criterion). Accordingly, both a temperature trend graph 31a and a pressure trend graph 32a are curves that extend substantially flat. In the trend graphs 3a (the temperature trend graph 31a and the pressure trend graph 32a) shown in FIGS. 3 and 4, the temperature is stable around 180° C. and the pressure is stable around 0.9 MPa.

Figure 5:
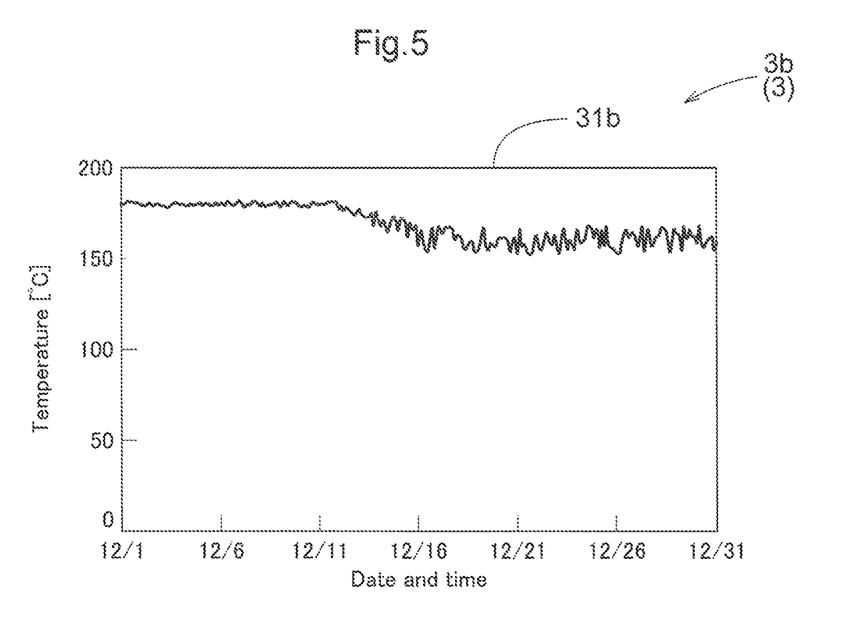
FIG. 5 is an example of a temperature trend graph in a case where an abnormality occurs in a steam trap.
Figure 6:
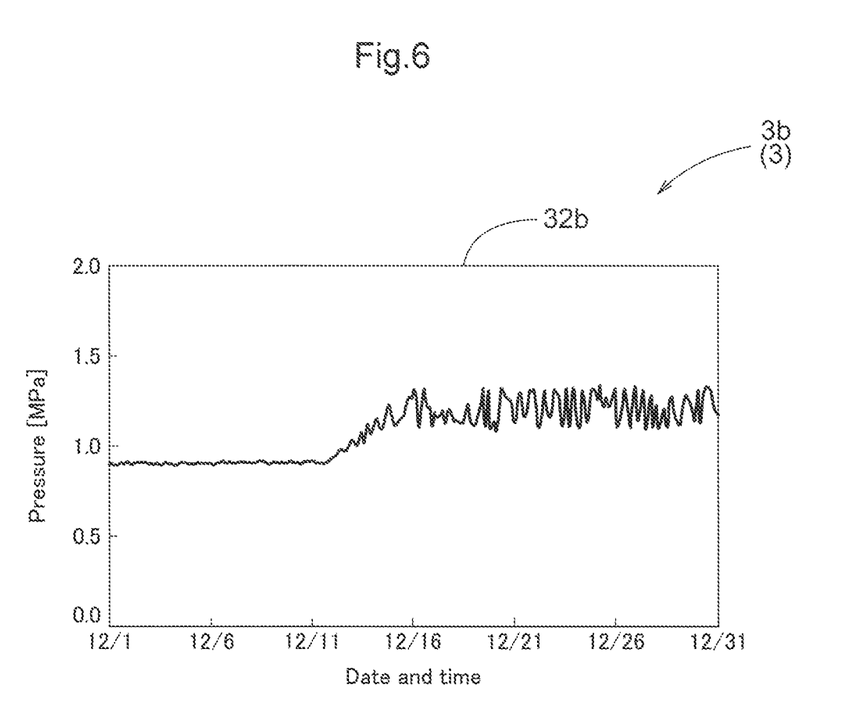
FIG. 6 is an example of a pressure trend graph in the case where an abnormality occurs in the steam trap.

FIGS. 5 and 6 show examples of trend graphs 3 (trend graphs 3b) in a case where the clogging abnormality occurs in the steam trap 23a. In a temperature trend graph 31b (FIG. 5), it can be found that the temperature started to gradually decrease from around December 11 and decreased to about 160° C. around December 16. Also, it can be found that the fluctuation range of the temperature after December 16 is larger than the fluctuation range of the temperature before December 11. In addition, in a pressure trend graph 32b (FIG. 6), it can be found that the pressure started to gradually increase from around December 11, and the fluctuation range of the pressure gradually increased.

As described above, the behaviors of the temperature and the pressure shown in the trend graphs 3b correspond to the above-described behaviors that can be seen in a case where the clogging abnormality occurs in the steam trap 23a. Accordingly, the computation unit 12b determines that the clogging abnormality (an example of an abnormality) is occurring in the steam trap 23a when a trend of temperature detection values (an example of statistical temperature data obtained by performing statistical processing on temperature detection values) obtained by the discharge side steam temperature sensor 23b shows a reduction of a median value and an increase of the fluctuation range (an example of deviating from a predetermined criterion) and a trend of pressure detection values (an example of statistical pressure data obtained by performing statistical processing on pressure detection values) obtained by the pressure sensor 11 shows an increase of a median value and an increase of the fluctuation range (an example of deviating from a predetermined criterion). More specifically, predetermined reference value ranges are set for the median values and the fluctuation ranges of the temperature and the pressure, and when both the temperature and the pressure deviate from the reference value ranges, it is determined that there is an occurrence of an abnormality or a sign of the abnormality in the steam trap 23a.

Figure 7:
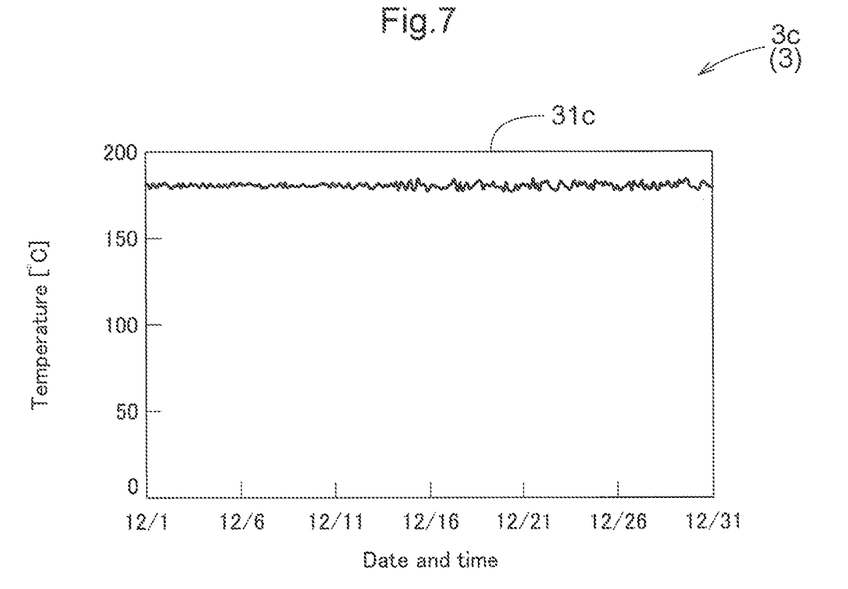
FIG. 7 is an example of a temperature trend graph in a case where an abnormality occurs in a control valve.
Figure 8:
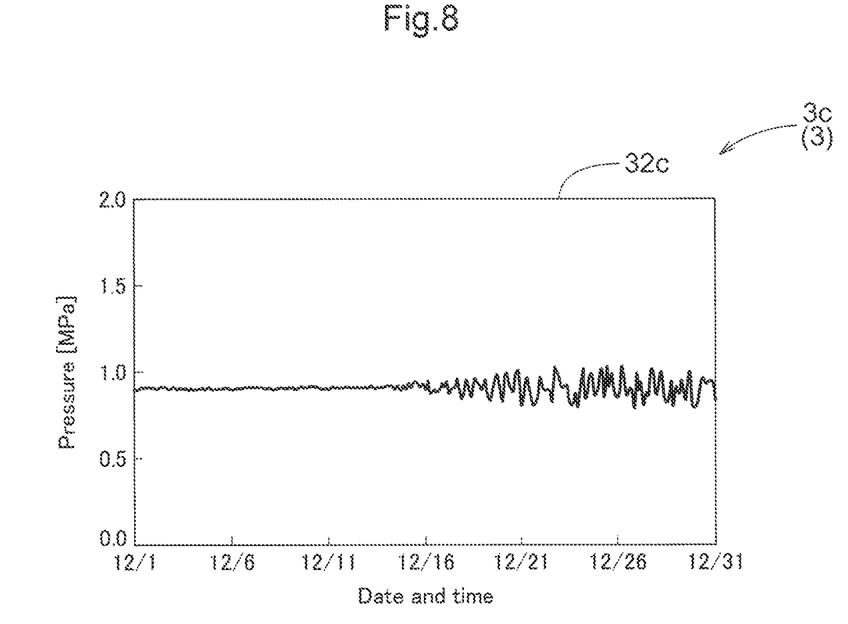
FIG. 8 is an example of a pressure trend graph in the case where an abnormality occurs in the control valve.

FIGS. 7 and 8 show examples of trend graphs 3 (trend graphs 3c) in a case where adhesion occurs in the control valve 21a due to corrosion. In a pressure trend graph 32c (FIG. 8), it can be found that the fluctuation range of the pressure gradually increased from around December 16. On the other hand, a temperature trend graph 31c (FIG. 7) shows behavior that is almost constant throughout the period shown in the graph.

As described above, the behaviors of the temperature and the pressure shown in the trend graphs 3c correspond to the above-described behaviors that can be seen in a case where opening and closing operations of the control valve 21a are not smoothly performed. Accordingly, the computation unit 12b determines that an abnormality is occurring in the control valve 21a when a trend of pressure detection values (an example of statistical pressure data obtained by performing statistical processing on pressure detection values) obtained by the pressure sensor 11 shows an increase of the fluctuation range (an example of deviating from a predetermined criterion), but a trend of temperature detection values (an example of statistical temperature data obtained by performing statistical processing on temperature detection values) obtained by the discharge side steam temperature sensor 23b is substantially the same as that during normal operation (an example of satisfying a predetermined criterion). In this case as well, more specifically, predetermined reference value ranges are set for the median values and the fluctuation ranges of the temperature and the pressure, and when only the pressure deviates from the reference value ranges, it is determined that there is an occurrence of an abnormality or a sign of the abnormality in the control valve 21*a*.

Conventionally, abnormalities relating to steam control devices such as the steam trap 23*a* and the control valve 21*a* are detected based on detection values of physical quantities such as the temperature and vibration of the devices, or visual inspection. The monitoring system 1 according to the present embodiment is characterized in that the monitoring system determines occurrence or signs of abnormalities relating to the steam control devices based on the temperature and the pressure of steam that flows through these devices, rather than physical quantities relating to these devices. The temperature and the pressure of steam fluctuates more sensitively than physical quantities relating to the devices, and accordingly, signs of abnormalities in the devices can be found even when the signs are small. In particular, through intensive studies, the inventor of the present invention first found that the pressure of steam responds even to a very slight abnormality.

Therefore, it is possible to perform repair, inspection, or the like on the devices as a preventive measure before an abnormality in the devices becomes serious and the steam-using facility 2 has to be stopped. Accordingly, it is possible to schedule maintenance of the devices for a scheduled stop period for periodic maintenance or the like, and maximize opportunities of production performed using the steam-using facility 2.

OTHER EMBODIMENTS

Lastly, other embodiments of the monitoring system, the monitoring method, and the monitoring program according to the present invention will be described. Note that configurations disclosed in each of the following embodiments can also be applied in combination with configurations disclosed in the other embodiments so long as no contradiction is incurred.

In the above embodiment, an example is described in which the monitoring system 1 is configured to be able to determine occurrence or signs of abnormalities relating to the steam trap 23*a* and the control valve 21*a*. However, there is no limitation to this configuration, and the monitoring system according to the present invention may be configured to be able to determine only occurrence or a sign of an abnormality relating to the steam trap.

In the above embodiment, an example is described in which the monitoring system 1 is configured to be able to determine occurrence or a sign of an abnormality relating to the steam trap 23*a* based on a detection signal of the discharge side steam temperature sensor 23*b*. However, there is no limitation to this configuration, and the monitoring system according to the present invention may also be configured to be able to determine occurrence or a sign of an abnormality relating to the steam trap based on a detection signal of a trap temperature sensor that detects the temperature of the steam trap. That is, in the monitoring system according to the present invention, a temperature sensor may be the trap temperature sensor and/or the steam temperature sensor.

In the above embodiment, an example is described in which the monitoring system 1 is configured to be able to determine occurrence or signs of abnormalities relating to the steam trap 23*a* and the control valve 21*a* based on trends of temperature detection values and pressure detection values. However, there is no limitation to this configuration, and the monitoring system according to the present invention may be configured to be able to determine occurrence or signs of abnormalities based on the temperature detection values and the pressure detection values. Also, in a case where statistical temperature data and statistical pressure data that are obtained by performing statistical processing on the temperature detection values and the pressure detection values are used, it is possible to use statistical data that is extracted using a suitable method, such as a standard deviation, the mode, the maximum value, or the minimum value, as well as the trend, median value, and fluctuation range described in the above embodiment. A configuration is also possible in which detection values are used for either one of the temperature and the pressure, and statistical data is used for the other.

In the above embodiment, an exemplary configuration is described in which the monitoring system 1 determines occurrence or a sign of an abnormality based on the temperature and the pressure of steam flowing into the steam trap 23*a*. However, there is no limitation to this configuration, and the monitoring system according to the present invention may additionally use, as a basis for the determination, a suitable physical quantity relating to the steam-using facility that is monitored. Examples of such a physical quantity include a steam flow rate, vibration of the steam trap, and a rotational frequency of the steam-using device, but are not limited to these.

In the above embodiment, specific examples of the trend graphs 3 are shown to describe an example in which the monitoring system 1 is configured to be able to determine occurrence or signs of abnormalities relating to the steam trap 23*a* and the control valve 21*a* based on trends of temperature detection values and pressure detection values. However, information that is used in the monitoring system according to the present invention to determine occurrence or signs of abnormalities need not be information in a form that is easy for the manager (human) to understand, such as the trend graphs 3 shown in FIGS. 3 to 8, and is not particularly limited so long as the information is in a form that is suitable for computation processing.

In the above embodiment, a configuration in which the monitoring system 1 includes the display unit 12*f* is described as an example. However, there is no limitation to this configuration, and the monitoring system according to the present invention may be configured so as not to include an input/output unit (user interface). However, the configuration in which the input/output unit (user interface) is included is preferable because the manager can easily grasp information and easily operate the monitoring system.

In the above embodiment, a configuration in which the monitoring system 1 monitors the single steam-using facility 2 is described. However, the monitoring system 1 according to the present invention may monitor a plurality of steam-using facilities 2 at the same time.

In the above embodiment, a configuration is described as an example in which the steam supply system that is upstream of the steam supply unit 21 is not a monitoring target of the monitoring system 1. However, the monitoring system 1 according to the present invention may also monitor the steam supply system that supplies steam to the steam-using facility, in addition to the steam-using facility.

In the above embodiment, a configuration in which the steam trap 23*a* includes the automatic cleaning mechanism is described as an example. However, there is no limitation to this configuration, and a configuration is also possible in which the steam trap provided in the steam-using facility monitored by the monitoring system according to the present invention does not include the automatic cleaning mechanism. For example, in a case where the steam trap includes, instead of the automatic cleaning mechanism, a manual cleaning mechanism that can be operated to remove a clogging material generated in the orifice portion, the manual cleaning mechanism may be operated by a worker who is instructed by the manager who recognized the occurrence or a sign of an abnormality.

With regard to the other configurations as well, it should be understood that the embodiments disclosed in the present specification are examples in all aspects, and the scope of the present invention is not limited by the embodiments. It should be easy for a person skilled in the art to understand that it is possible to apply modifications as appropriate without departing from the gist of the present invention. Therefore, as a matter of course, other embodiments that are modified without departing from the gist of the present invention are included in the scope of the present invention.

INDUSTRIAL APPLICABILITY

The present invention can be used to monitor steam-using devices such as a steam turbine, a hot-water generation unit, a press machine, an autoclave, a reactor, and a heater.

DESCRIPTION OF REFERENCE SIGNS

1: Monitoring system
11: Pressure sensor
12: Monitoring and control unit
12a: Signal input unit
12b: Computation unit
12c: Abnormality notification unit
12d: Cleaning control unit
12e: Storage unit
12f: Display unit
2: Steam-using facility
21: Steam supply unit
21a: Control valve
21b: Supply side steam temperature sensor
22: Steam-using unit
22a: Steam-using device
23: Steam discharge unit
23a: Steam trap
23b: Discharge side steam temperature sensor
24: Steam pipe
25: Facility control unit
3: Trend graph
31: Temperature trend graph
32: Pressure trend graph

The invention claimed is:

1. A monitoring system configured to monitor a steam-using facility that includes a steam supply unit that is supplied with steam, a steam-using unit that uses supplied steam, and a steam discharge unit that discharges steam after use, the monitoring system comprising:
a temperature sensor that is at least one of a trap temperature sensor configured to detect a temperature of a steam trap provided in the steam discharge unit and a steam temperature sensor configured to detect a temperature of steam flowing into the steam trap; and
a pressure sensor configured to detect a pressure of steam flowing into the steam trap,
wherein
the monitoring system determines that there is an occurrence of an abnormality or a sign of the abnormality in the steam trap when (i) a temperature detection value obtained by at least one of the temperature sensor and statistical temperature data obtained by performing statistical processing on the temperature detection value deviates from a predetermined criterion thereof and (ii) a pressure detection value obtained by at least one of the pressure sensor and statistical pressure data obtained by performing statistical processing on the pressure detection value deviates from a predetermined criterion thereof, and
wherein the monitoring system determines that there is an occurrence of an abnormality or there is a sign of the abnormality in a steam supply valve that is provided in the steam supply unit when (i) at least one of the pressure detection value and the statistical pressure data deviates from a predetermined criterion thereof and (ii) the temperature detection value and the statistical temperature data satisfy predetermined criteria thereof.

2. The monitoring system according to claim 1, further comprising:
an abnormality notification unit that can notify a manager of the steam-using facility of occurrence of an abnormality when it is determined that there is an occurrence of the abnormality or there is a sign of the abnormality.

3. The monitoring system according to any one of claim 1, wherein:
the steam trap comprises an automatic cleaning mechanism that can automatically remove a clogging material generated in the steam trap, and
the monitoring system operates the automatic cleaning mechanism upon determining that there is an occurrence of an abnormality or a sign of the abnormality in the steam trap.

4. A monitoring method for monitoring a steam-using facility that includes a steam supply unit that is supplied with steam, a steam-using unit that uses supplied steam, and a steam discharge unit that discharges steam after use, the monitoring method comprising:
a temperature detection step of detecting, with a temperature sensor, at least one of a temperature of a steam trap provided in the steam discharge unit and a temperature of steam flowing into the steam trap;
a pressure detection step of detecting, with a pressure sensor, a pressure of steam flowing into the steam trap; and
a determination step of:
determining, with at least one processor, that there is an occurrence of an abnormality or a sign of the abnormality in the steam trap when (i) at least one of a temperature detection value obtained in the temperature detection step and statistical temperature data obtained by performing statistical processing on the temperature detection value deviates from a predetermined criterion thereof and (ii) at least one of a pressure detection value obtained in the pressure detection step and statistical pressure data obtained by performing statistical processing on the pressure detection value deviates from a predetermined criterion thereof, and
determining that there is an occurrence of an abnormality or there is a sign of the abnormality in a steam supply valve that is provided in the steam supply unit when (i) at least one of the pressure detection value and the statistical pressure data deviates from a predetermined criterion thereof and (ii) the temperature detection value and the statistical temperature data satisfy predetermined criteria thereof.

5. A computer program product comprising at least one non-transitory computer-readable medium including a monitoring program for monitoring a steam-using facility that includes a steam supply unit that is supplied with steam, a steam-using unit that uses supplied steam, and a steam discharge unit that discharges steam after use, the monitoring program, when executed by a computer comprising at least one processor, causing the computer to perform:
- a temperature detection function for detecting a signal from at least one of a trap temperature sensor configured to detect a temperature of a steam trap provided in the steam discharge unit and a steam temperature sensor configured to detect a temperature of steam flowing into the steam trap;
- a pressure detection function for detecting a signal from a pressure sensor configured to detect a pressure of steam flowing into the steam trap; and
- a determination function for:
- determining that there is an occurrence of an abnormality or a sign of the abnormality in the steam trap when (i) at least one of a temperature detection value obtained by executing the temperature detection function and statistical temperature data obtained by performing statistical processing on the temperature detection value deviates from a predetermined criterion thereof and (ii) at least one of a pressure detection value obtained by executing the pressure detection function and statistical pressure data obtained by performing statistical processing on the pressure detection value deviates from a predetermined criterion thereof, and
- determining that there is an occurrence of an abnormality or there is a sign of the abnormality in a steam supply valve that is provided in the steam supply unit when (i) at least one the pressure detection value and the statistical pressure data deviates from a predetermined criterion thereof and (ii) the temperature detection value and the statistical temperature data satisfy predetermined criteria thereof.

* * * * *

UNITED STATES PATENT AND TRADEMARK OFFICE
CERTIFICATE OF CORRECTION

PATENT NO. : 11,294,366 B2
APPLICATION NO. : 17/427310
DATED : April 5, 2022
INVENTOR(S) : Kazuki Nakanishi Page 1 of 1

It is certified that error appears in the above-identified patent and that said Letters Patent is hereby corrected as shown below:

On the Title Page

Item (30), Foreign Application Priority Data, Line 1, delete "Jan. 13," and insert -- Jan. 31, --

In the Claims

Column 12, Line 26, Claim 3, after "to" delete "any one of"

Column 14, Line 14, Claim 5, after "one" insert -- of --

Signed and Sealed this
Twenty-fourth Day of January, 2023

Katherine Kelly Vidal
*Director of the United States Patent and Trademark Office*